United States Patent
Landt et al.

(10) Patent No.: US 9,461,743 B1
(45) Date of Patent: Oct. 4, 2016

(54) PULSE TO DIGITAL DETECTION CIRCUIT

(71) Applicants: Don L. Landt, Palo, IA (US); Phillip R. Koenig, Martelle, IA (US)

(72) Inventors: Don L. Landt, Palo, IA (US); Phillip R. Koenig, Martelle, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/333,031

(22) Filed: Jul. 16, 2014

(51) Int. Cl.
| | | |
|---|---|---|
| *H04B 10/66* | (2013.01) | |
| *H04B 17/00* | (2015.01) | |
| *H04B 10/60* | (2013.01) | |
| *H04B 10/2575* | (2013.01) | |
| *H04B 10/079* | (2013.01) | |

(52) U.S. Cl.
CPC .... *H04B 10/2575* (2013.01); *H04B 10/07955* (2013.01)

(58) Field of Classification Search
CPC .............. H04B 10/2575; H04B 10/07955; H04B 10/66; G02B 6/125
USPC ................... 398/115, 202, 204, 207
See application file for complete search history.

(56) References Cited

U.S. PATENT DOCUMENTS

| | | | | |
|---|---|---|---|---|
| 4,850,698 A * | 7/1989 | Kordts | ................ | H04B 10/502 250/208.5 |
| 5,191,336 A * | 3/1993 | Stephenson | ........... | G04F 10/005 341/111 |
| 5,402,019 A * | 3/1995 | Drummond | ............... | H04L 7/00 327/237 |
| 6,259,281 B1 * | 7/2001 | Neff | .................... | H03M 1/0624 327/91 |
| 6,292,052 B1 * | 9/2001 | Carlson | ............. | H04L 25/03885 327/124 |
| 6,359,467 B1 * | 3/2002 | McCarroll | .............. | G06F 7/762 326/126 |
| 7,218,154 B1 * | 5/2007 | Pantuček | ............. | G11C 27/026 327/94 |
| 7,378,854 B2 * | 5/2008 | Xu | .......................... | G04F 10/00 324/617 |
| 7,511,652 B1 * | 3/2009 | Liu | ......................... | H03K 5/24 341/120 |
| 7,858,893 B1 * | 12/2010 | Haff | ..................... | B07C 5/3425 209/576 |
| 7,894,728 B1 * | 2/2011 | Sun | ........................ | H04B 10/60 398/208 |
| 2003/0090289 A1 * | 5/2003 | Morley | ................. | H01S 5/0014 372/38.1 |
| 2006/0120732 A1 * | 6/2006 | Baek | ..................... | H04B 10/66 398/202 |

(Continued)

*Primary Examiner* — Oommen Jacob
(74) *Attorney, Agent, or Firm* — Angel N. Gerdzhikov; Donna P. Suchy; Daniel M. Barbieri

(57) ABSTRACT

A circuit relies on the natural time constant presented to a pulse input signal which drops the signal level to a very low value "zero state," less than 0.1 percent of the peak value, before the next pulse arrives. The signal is amplified with a low-noise, wideband, AC-coupled amplifier and split into two equal signals. One of the signals is delayed relative to the other by a fraction of the repetition period and then both signals are input to separate very wideband track-and-hold circuits. Output signals from the track-and-hold circuits are amplified, subtracted and applied to the input of an analog-to-digital converter. The track-and-hold circuits are clocked in such a way that one track-and-hold holds the value at the peak of the signal and the other track-and-hold holds the value at the baseline of the signal, the point when the signal has decayed to the zero state.

15 Claims, 5 Drawing Sheets

(56) References Cited

U.S. PATENT DOCUMENTS

| | | | |
|---|---|---|---|
| 2007/0109159 A1* | 5/2007 | Stein | G11B 27/026 327/94 |
| 2007/0133719 A1* | 6/2007 | Agazzi | H03M 1/0626 375/341 |
| 2007/0133722 A1* | 6/2007 | Agazzi | H03M 1/0626 375/346 |
| 2008/0158548 A1* | 7/2008 | Chen | G01J 1/1626 356/73 |
| 2008/0238754 A1* | 10/2008 | Knudsen | H03M 1/124 341/166 |
| 2011/0163788 A1* | 7/2011 | Thibault | H03K 5/06 327/173 |
| 2011/0309962 A1* | 12/2011 | Hernes | G06F 1/04 341/122 |
| 2012/0050081 A1* | 3/2012 | Bright | H03M 1/1215 341/122 |
| 2012/0126869 A1* | 5/2012 | Payne | H03L 7/0812 327/161 |
| 2013/0039649 A1* | 2/2013 | Koizumi | H04B 10/697 398/25 |
| 2013/0208264 A1* | 8/2013 | Ahadian | G01M 11/3145 356/73.1 |
| 2013/0307742 A1* | 11/2013 | Hu | H01Q 1/243 343/821 |
| 2014/0152477 A1* | 6/2014 | Lewis | H03M 1/1061 341/122 |
| 2015/0130513 A1* | 5/2015 | Landolt | H03M 1/1245 327/94 |

* cited by examiner

PULSE TO DIGITAL DETECTION CIRCUIT

FIELD OF THE INVENTION

The present invention is directed generally toward radio communication systems, and more particularly toward digital conversion systems.

BACKGROUND OF THE INVENTION

Advanced Radio Systems, in particular those where information is stored in the amplitude of very short optical pulses, may require conversion by an optical-to-electric component (photodiode) followed by amplification, sampling in a track-and-hold circuit, conversion to digital form in an analog-to-digital converter, and finally feeding to a CPU for information extraction. Existing systems use narrow-band, continuous sine wave modulated light sources to produce a sine wave signal to track-and-hold circuits. The signals are AC coupled and any DC content is lost.

Existing systems are poorly suited for digitizing very short optical pulses (from tenths of picoseconds to tens of picoseconds). Short optical pulses may arise from sampling a high speed signal, thus the light power in each pulse represents the high-speed signal amplitude at various points in time. The difficulty increases rapidly if the pulse repetition frequency (PRF) is increased to rates above ten GHz. Such pulse signals require very broadband amplifiers, DC capable, to maintain fidelity. This type of amplifier is difficult to construct because small DC bias changes at the input of the amplifier can drive the output stages of the amplifier into saturation producing a very non-linear voltage response. The small DC bias changes can be caused by temperature changes, input and output VSWR changes or power supply voltage ripples and noise.

In existing "integrate and dump" circuits, a capacitor is employed as an integrating element of the pulsed photocurrent $I_p(t)$:

$$v(t) = \frac{1}{C} \int_{-\infty}^{t} I_p(t) dt$$

The sharp rise and fall times of the input pulse become smoothed out. The peak amplitude of the smoothed out pulse is proportional to the peak energy in the light pulse. Typically this peak value is sampled in a track-and-hold circuit and is sent to an analog-to-digital converter. After the sample is taken the voltage is quickly shorted to zero in preparation for the next current pulse.

System noise induced by voltage transients created by the sudden shorting of the signal line and a failure to reestablish a DC zero value before the next pulse arrives are major limitations to the "integrate and dump" methodology.

Alternatively, a system may measure the DC offset from the AC coupled amplifier and add the offset value back on the original signal. Matching the instantaneous gain of the circuit for both the AC and DC signals to less than a least significant bit value, timing differences between the AC and DC signal path propagation difference and inter-symbol interference are major limitations to the DC offset methodology.

Consequently, it would be advantageous if an apparatus existed that is suitable for digitizing a signal based on a very narrow voltage pulse with rapid pulse repetition frequency.

SUMMARY OF THE INVENTION

Accordingly, the present invention is directed to a novel method and apparatus for digitizing a signal based on a very narrow voltage pulse with rapid pulse repetition frequency.

In one embodiment, a circuit includes a photodiode driven by a pulse of light, an amplifier, a splitter and two track-and-hold elements and a delay corresponding to one track-and-hold element. An extremely accurate measurement can be performed representing the peak amplitude in the original pulsed signal. The circuit relies on the natural time constant presented to the pulse input signal which drops the signal level to a very low value "zero state," less than 0.1 percent of the peak value, before the next pulse arrives. The signal is amplified with a low-noise, wideband, AC-coupled amplifier and split into two equal signals. One of the signals is delayed relative to the other by a fraction of the repetition period and then both signals are input to separate very wideband track-and-hold circuits. Output signals from the track-and-hold circuits are amplified, subtracted and applied to the input of an analog-to-digital converter. The track-and-hold circuits are clocked in such a way that one track-and-hold holds the value at the peak of the signal and the other track-and-hold holds the value at the baseline of the signal, the point when the signal has decayed to the zero state. By taking the difference of these two signals a peak-to-valley voltage value can be obtained and digitized from each pulse. This value accurately represents the total voltage amplitude in the original pulsed signal, independent of past values of the input signal. The technique provides a more accurate energy determination than prior techniques such as those using DC amplification, integrate-and-dump processing or various types of DC restoration techniques.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1A:
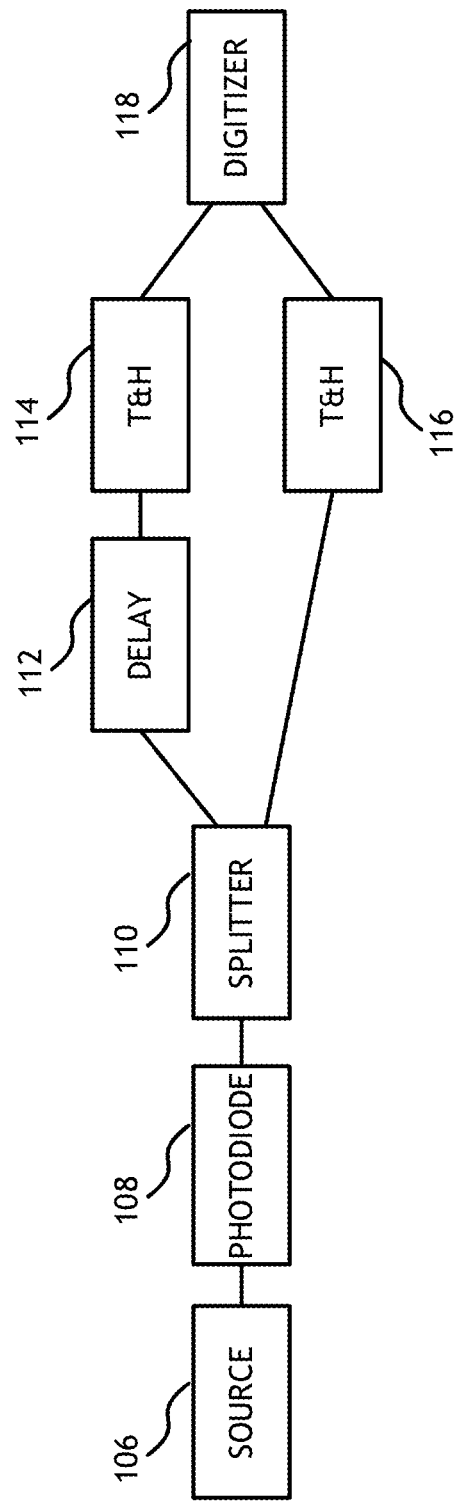
FIG. 1A shows a block diagram of a computer apparatus suitable for implementing embodiments of the present invention.
Figure 1B:
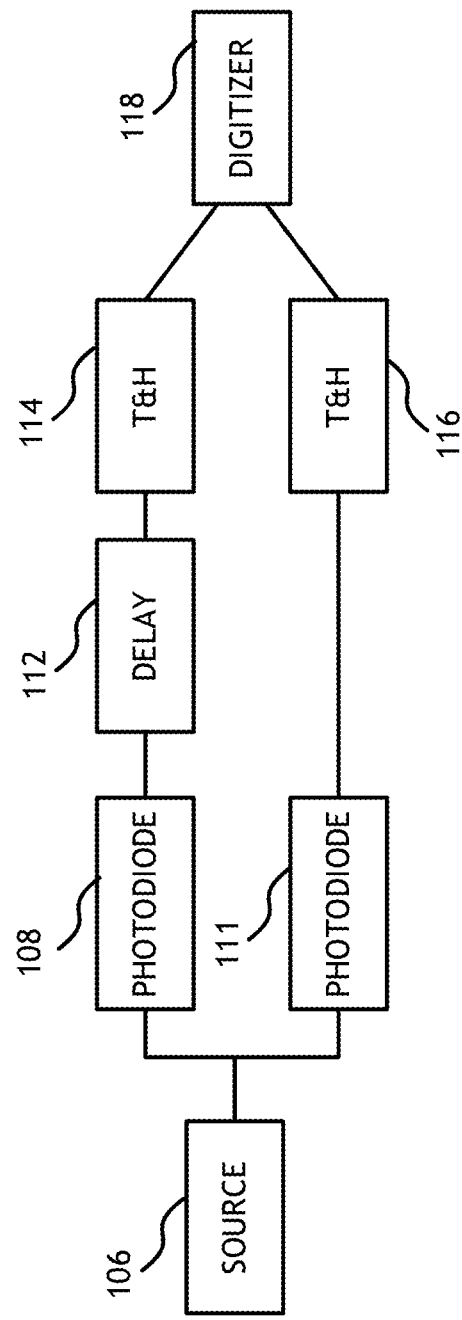
FIG. 1B shows a block diagram of a computer apparatus suitable for implementing embodiments of the present invention.

Referring to FIGS. 1A and B, block diagrams of a computer apparatus suitable for implementing embodiments of the present invention are shown. According to at least one embodiment of the present invention, a computer apparatus for pulse to digital conversion includes a light source 106 to produce an optical pulse. The optical pulse may be received by a photodiode 108 and converted to an electrical signal. The signal may be split by a splitter 110. One of the resulting signals may be delayed 112 and each signal tracked and held 114, 116 for measurement by a digitizer 118. Alternatively, the optical pulse may be received by a first photodiode 108 and a second photodiode 111 and converted to electrical signals. One of the resulting signals may be delayed 112 and each signal tracked and held 114, 116 for measurement by a digitizer 118.

Figure 2:
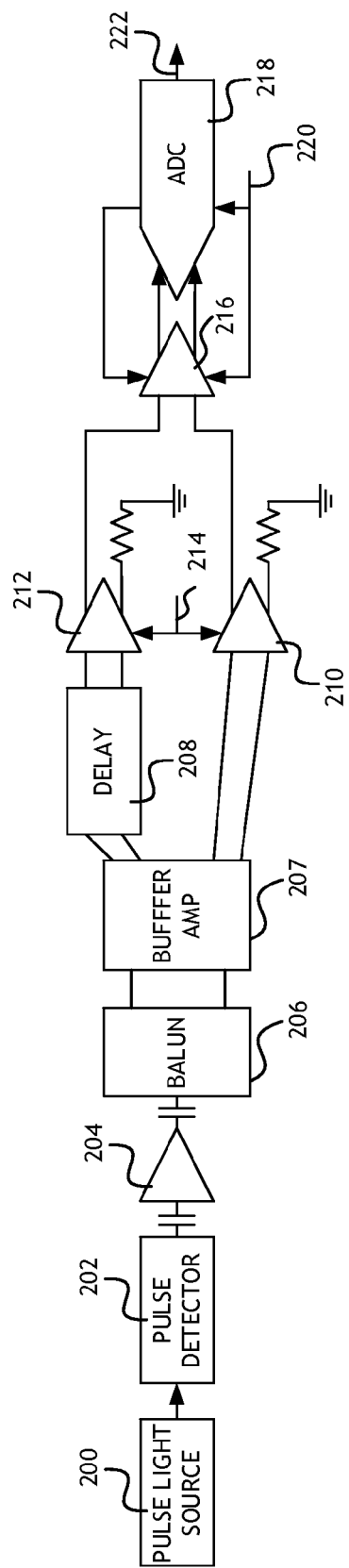
FIG. 2 shows a block diagram of a circuit according to at least one embodiment of the present invention.

Referring to FIG. 2, a block diagram of a circuit according to at least one embodiment of the present invention is shown. In at least one embodiment, the circuit comprises a pulse light source 200 and a pulse detector 202, such as a photodiode, configured to convert a light pulse from the pulse light source 200 to an electrical signal. The pulse detector 202 converts the light pulses to a string of current pulses. The electrical pulsed current output is directly proportional to the "pulsed light power" input to the pulse detector 202. For each pulse:

$$I_{pulse} = R_{detector} * P_{pulse}$$

where $R_{detector}$ is the Responsivity of the pulse detector 202. Since the light power $P_{pulse}$ in each pulse is always positive the current pulses $I_{pulse}$ will always be in one direction through the pulse detector 202. The current $I_{pulse}$ is typically in the direction opposite to the normal positive current flow convention in a diode.

Parasitic capacitance in the pulse detector 202 and the parasitic inductances in connections to the pulse detector 202 are usually large enough to considerably slow the rising and falling edges of the pulse, resulting in an exponential rising and falling pulse response. The pulse response of the pulse detector 202 is usually chosen so that the voltage pulse decays to a very low level before the next pulse arrives.

The peak voltage of the electrical signal is the salient quantity to measure. In at least one embodiment of the present invention, the peak voltage is measured with reference to the output of the pulse detector 202 some predetermined time after the pulse is initially received such that the electrical signal amplitude will have decayed to a value less than one least significant bit.

To obtain resolutions approaching 10 ENOB (effective number of bits) the DC value must be established with reference to zero volts to within one-half of a voltage corresponding to a least significant bit (LSB). So for a high range value of one volt, a "zero" voltage must be defined plus or minus 0.25 millivolts.

In at least one embodiment, the pulse light source 200 may produce pulses having a full-width at half-maximum (FWHM) or full-duration at half-maximum (FDHM) of no more than twenty picoseconds and in some embodiment no more than ten picoseconds. Furthermore, the pulse light source 200 may produce pulses with a pulse repetition frequency (PRF) of between one and twenty gigahertz.

The electrical signal from the pulse detector 202 may be sent to an AC coupled wideband low-noise amplifier 204. In at least one embodiment, the AC coupled wideband low-noise amplifier 204 is isolated via one or more capacitors such that only the voltage of the electrical signal is received and amplified. An amplified electrical signal corresponding to a pulse is then sent to a balun 206 and a voltage buffer amplifier 207. The balun 206 may convert the ground referenced, amplified electrical signal to two opposing electrical signals. Alternatively, in another embodiment of the present invention, two electrical signals may be produced by two independent pulse detectors 202 operating on pulse from the same pulse light source 200.

The two opposing electrical signals are sent to two track-and-hold elements 210, 212. The signals directed toward the second track-and-hold element 212 may be delayed by a delay element 208 for a predetermined period. In one embodiment the delay element 208 may delay the electrical signals to the second track-and-hold element 212 by 460 picoseconds. Each track-and-hold element 210, 212 is driven by a clock signal 214. The clock signal 214 may be substantially similar to the pulse repetition frequency.

The output from the first track-and-hold element 210 and the second track-and-hold element 212 are sent to an output amplifier 216. The output from the first track-and-hold element 210 may comprise a low voltage input to the output amplifier 216 while the output from the second, delayed track-and-hold element 212 may comprise a high voltage input to the output amplifier 216. One or more outputs from the output amplifier 216 may be sent to an analog-to-digital converter 218 that converts the voltage difference between the one or more outputs from the output amplifier 216 into a digital signal output 222. Outputs from the output amplifier 216 may comprise a first voltage representing a peak voltage of a pulse, held for a period corresponding to the clock cycle 214, and a second voltage representing a "zero" voltage after the pulse has had sufficient time to decay to a voltage level less than one least significant bit, held for a period corresponding to the clock cycle 214. The analog-to-digital converter 218 thereby has sufficient time (half of one clock cycle) to perform the necessary voltage measurement.

The analog-to-digital converter 218 and output amplifier 216 may be driven by a clock signal 220. In at least one embodiment, the clock signal 220 may be substantially similar to the clock signal 214 that drives the track-and-hold elements 210, 212. In at least one embodiment, the analog-to-digital converter 218 may supply a voltage bias to the output amplifier 216; for example, the analog-to-digital converter 218 may supply a voltage bias of 1.25 volts to the output amplifier 216.

Figure 3:
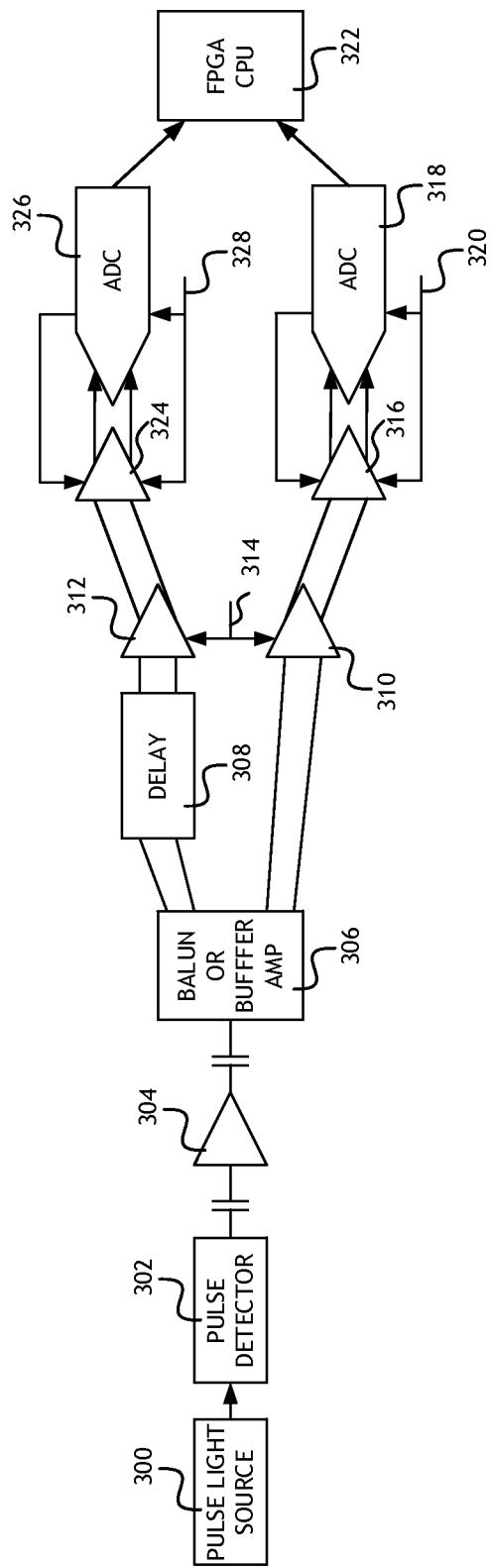
FIG. 3 shows a block diagram of a circuit according to at least one embodiment of the present invention.

Referring to FIG. 3, a block diagram of a circuit according to at least one embodiment of the present invention is shown. In at least one embodiment, the circuit comprises a pulse light source 300 and a pulse detector 302 configured to convert a light pulse from the pulse light source 300 to an electrical signal. The peak voltage of the electrical signal is the salient quantity to measure. In at least one embodiment of the present invention, the peak voltage is measured with reference to a measured "zero-state" or ground state voltage prior from the output of the pulse detector 302 some predetermined time after the pulse is initially received such that the electrical signal amplitude will have decayed to a value less than one least significant bit.

In at least one embodiment, the pulse light source 300 may produce pulses having a full-width at half-maximum or full-duration at half-maximum of no more than twenty picoseconds and in some embodiment no more than ten picoseconds. Furthermore, the pulse light source 300 may produce pulses with a pulse repetition frequency of one gigahertz or higher.

The electrical signal from the pulse detector 302 may be sent to an AC coupled wideband low-noise amplifier 304. In at least one embodiment, the AC coupled wideband low-noise amplifier 304 is isolated via one or more capacitors such that only the voltage of the electrical signal is received and amplified. An amplified electrical signal corresponding to a pulse is then sent to a balun or voltage buffer amplifier 306. The balun or voltage buffer amplifier 306 may convert the ground referenced, amplified electrical signal to two opposing electrical signals. The two opposing electrical signals are sent to two track-and-hold elements 310, 312. The signals directed toward the second track-and-hold element 312 may be delayed by a delay element 308 for a predetermined period. In one embodiment the delay element 308 may delay the electrical signals to the second track-and-hold element 312 by 460 picoseconds. Each track-and-hold element 310, 312 is driven by a clock signal 314. The clock signal 314 may be substantially similar to the pulse repetition frequency.

The outputs from the first track-and-hold element 310 are sent to a first output amplifier 316. The outputs from the first track-and-hold element 310 may comprise a low voltage input and reference voltage to the first output amplifier 316. One or more outputs from the first output amplifier 316 may be sent to a first analog-to-digital converter 318 that converts the voltage difference between the one or more outputs from the first output amplifier 316 into a digital signal. The digital signal is then sent to a field-programmable gate array 322.

Furthermore, the outputs from the second track-and-hold element 312 are sent to a second output amplifier 324. The outputs from the second track-and-hold element 312 may comprise a high voltage input and reference voltage to the second output amplifier 324. One or more outputs from the second output amplifier 324 may be sent to a second analog-to-digital converter 326 that converts the voltage difference between the one or more outputs from the second output amplifier 324 into a digital signal. The digital signal is then sent to a field-programmable gate array 322.

Outputs from the first output amplifier 316 may comprise a first voltage representing a voltage level less than one least significant bit, held for a period corresponding to the clock cycle 314, and a second voltage representing a reference voltage. The first analog-to-digital converter 318 thereby has sufficient time (half of one clock cycle) to perform the necessary voltage measurement. Likewise, outputs from the second output amplifier 324 may comprise a second voltage representing a peak voltage of a pulse, held for a period corresponding to the clock cycle 314, and a second voltage representing a reference voltage. The second analog-to-digital converter 326 thereby has sufficient time (half of one clock cycle) to perform the necessary voltage measurement.

The first analog-to-digital converter 318 and first output amplifier 316 may be driven by a first clock signal 320. In at least one embodiment, the first clock signal 320 may be substantially similar to the clock signal 314 that drives the track-and-hold elements 310, 312. In at least one embodiment, the first analog-to-digital converter 318 may supply a voltage bias to the first output amplifier 316; for example, the first analog-to-digital converter 318 may supply a voltage bias of 1.25 volts to the first output amplifier 316. Likewise, the second analog-to-digital converter 326 and second output amplifier 324 may be driven by a second clock signal 328. In at least one embodiment, the second clock signal 328 may be substantially similar to the clock signal 314 that drives the track-and-hold elements 310, 312. In at least one embodiment, the second analog-to-digital converter 326 may supply a voltage bias to the second output amplifier 324; for example, the second analog-to-digital converter 326 may supply a voltage bias of 1.25 volts to the second output amplifier 324. A person skilled in the art may appreciate that the first clock signal 320 and second clock signal 328 may be substantially identical.

Figure 4:
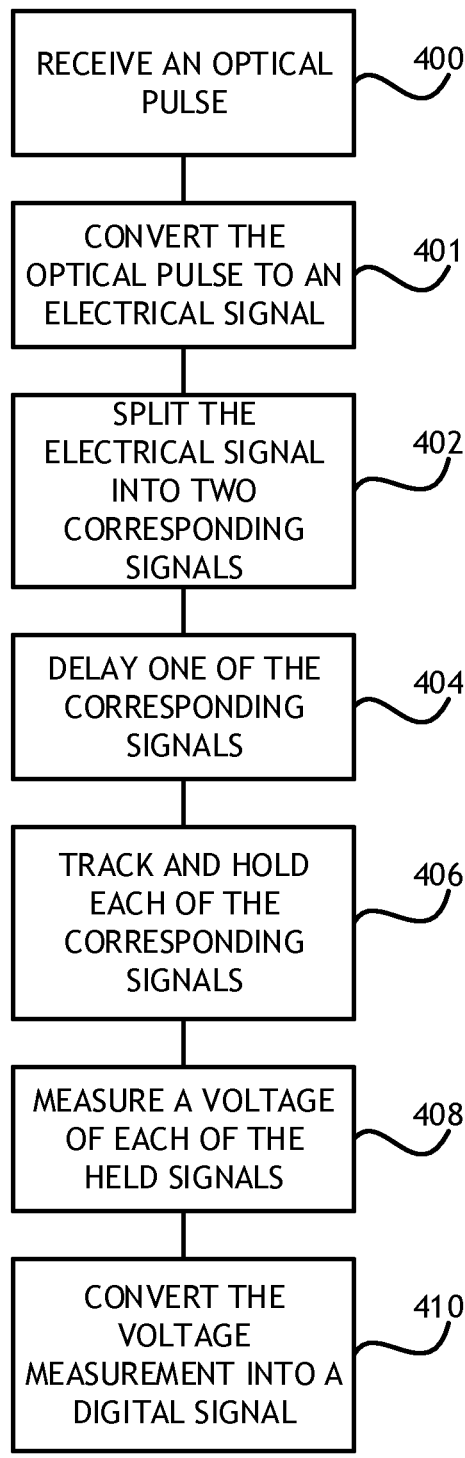
FIG. 4 shows a flowchart for a method according to at least one embodiment of the present invention.

Referring to FIG. 4, a flowchart for a method according to at least one embodiment of the present invention is shown. In at least one embodiment, a computer apparatus or specialized processing circuit receives 400 an optical pulse signal. The optical pulse signal is converted 401 to an electrical signal. The electrical signal is split 402 into two corresponding signals. In one embodiment, splitting 402 the electrical signals may comprise converting the signal into first signal and a corresponding obverse signal. In that embodiment, the voltage of the obverse signal may be reversed.

One of the resulting split signals may be delayed 404 for a period corresponding to a duration necessary for the electrical signal to decay to a voltage level less than the voltage defined by a least significant bit, for example immediately prior to a subsequent pulse. Alternatively, a clock signal driving a track-and-hold element may be delayed, effectively resulting in a delayed signal corresponding to a "zero state." Each of the two split signals are tracked and held 406 such that voltage levels necessary for measuring 408 the peak voltage of the pulse relative to the voltage defined by the least significant bit are maintained for a period. The measured voltage is then converted 410 to a digital signal.

Pulse detection and measurement circuitry may have applications in high-speed, high-resolution, broad bandwidth receiver systems and in commercial data link systems and military data link and SIGNIT systems.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A data communication apparatus comprising:
   a photodiode configured to convert a light pulse to an electrical signal;
   a balun configured to split the electrical signal into a first electrical signal and a second electrical signal;
   an electronic delay to delay the first electrical signal by a duration greater than or equal to an amount of time necessary for the electrical signal to decay to a voltage value corresponding to a least significant bit;
   a first track-and-hold element connected to the delay, configured to sample the first electrical signal;
   a first analog-to-digital converter connected to the first track-and-hold element, configured to measure and digitize a first sampled electrical signal with reference to a first reference voltage;
   a second track-and-hold element configured to sample the second electrical signal of the two electrical signals;
   a second analog-to-digital converter connected to the second track-and-hold element, configured to measure and digitize a second sampled electrical signal with reference to a second reference voltage; and a processor configured to convert a signal corresponding to a voltage difference between the first electrical signal and the second electrical signal into a digital output, wherein the first analog to digital converter and the second analog to digital converter are connected to the processor.

2. The apparatus of claim 1, further comprising an AC amplifier configured to amplify the two electrical signals.

3. The apparatus of claim 1, further comprising an analog subtractor interposed between the first and second track-and-hold elements and the processor.

4. The apparatus of claim 1, wherein measuring the voltage difference comprises measuring a first sampled electrical signal with reference to a second sampled electrical signal.

5. The apparatus of claim 1, wherein the processor comprises a field-programmable gate array.

6. The apparatus of claim 1, further comprising a light source configured to apply pulses to the photodiode.

7. An apparatus for digitizing a signal based on a light pulse comprising:
- a first photodiode configured to convert a light pulse to a first electrical signal;
- a second photodiode configured to convert the light pulse to a second electrical signal;
- a delay to delay the first electrical signal by a duration greater than or equal to an amount of time necessary for the first electrical signal to decay to a voltage value corresponding to a least significant bit;
- a first track-and-hold element connected to the delay, configured to sample the first electrical signal;
- a first analog-to-digital converter connected to the first track-and-hold element, configured to measure and digitize a first sampled electrical signal with reference to a first reference voltage;
- a second track-and-hold elements configured to sample the second electrical signal;
- a second analog-to-digital converter connected to the second track-and-hold element, configured to measure and digitize a second sampled electrical signal with reference to a second reference voltage; and
- a processor configured to convert a signal corresponding to a voltage difference between the first electrical signal and the second electrical signal into a digital output, wherein the first analog to digital converter and the second analog to digital converter are connected to the processor.

8. The apparatus of claim 7, further comprising an AC amplifier configured to amplify the two electrical signals.

9. The apparatus of claim 7, wherein measuring the voltage difference comprises measuring a first sampled electrical signal with reference to a second sampled electrical signal.

10. The apparatus of claim 7, wherein the processor comprises a field-programmable gate array.

11. The apparatus of claim 7, further comprising a light source configured to apply pulses to the photodiode.

12. A method for digitizing a signal based on a light pulse comprising:
- receiving a light pulse by a first photodiode to produce a first electrical signal;
- receiving the light pulse by a second photodiode to produce a second electrical signal;
- measuring a first sampled electrical signal with reference to a first reference voltage;
- measuring a second sampled electrical signal with reference to a second reference voltage;
- delaying the first electrical signal by a duration greater than or equal to an amount of time necessary for the first electrical signal to decay to a voltage value corresponding to a least significant bit;
- sampling each of the two electrical signals;
- digitizing the first sampled electrical signal;
- digitizing the second sampled electrical signal;
- measuring a voltage difference between the two electrical signals;
- converting the voltage difference to a digital signal; and
- combining the digitized electrical signals with a field-programmable gate array.

13. The method of claim 12, further comprising amplifying the two electrical signals with an AC amplifier.

14. The method of claim 12, wherein measuring the voltage difference comprises measuring a first sampled electrical signal with reference to a second sampled electrical signal.

15. The method of claim 12, further comprising relaying the digital signal to a data communication processor.

* * * * *